United States Patent [19]

Dayen

[11] 4,374,552
[45] Feb. 22, 1983

[54] PIVOTED LEVER CALIPER BRAKE

[75] Inventor: Leonid Dayen, Plymouth, Minn.

[73] Assignee: Horton Manufacturing Co., Inc., Minneapolis, Minn.

[21] Appl. No.: 252,288

[22] Filed: Apr. 9, 1981

Related U.S. Application Data

[63] Continuation of Ser. No. 53,413, Jun. 29, 1979, abandoned.

[51] Int. Cl.³ .............................................. F16D 55/10
[52] U.S. Cl. .................................................. 188/72.9
[58] Field of Search ................... 188/71.7, 72.6, 72.9, 188/59, 153 D, 196 M, 344

[56] References Cited

U.S. PATENT DOCUMENTS

| | | | |
|---|---|---|---|
| 869,948 | 11/1907 | Turner | 188/344 |
| 2,911,070 | 11/1959 | Seeling | 188/59 |
| 3,103,990 | 9/1963 | Wilkinson | 188/72.6 |
| 3,219,153 | 11/1965 | Cadion | 188/72.9 |
| 3,465,849 | 9/1969 | Bernfeld et al. | 188/196 M |
| 3,993,174 | 11/1976 | Williams et al. | 188/344 |
| 4,193,479 | 3/1980 | Quilici | 188/72.9 |

FOREIGN PATENT DOCUMENTS

| | | | |
|---|---|---|---|
| 122604 | 10/1946 | Australia . | |
| 202368 | 10/1955 | Australia . | |
| 203404 | 10/1955 | Australia . | |
| 1680633 | 1/1970 | Fed. Rep. of Germany | 188/72.9 |
| 2426951 | 1/1976 | Fed. Rep. of Germany . | |
| 2528480 | 1/1977 | Fed. Rep. of Germany . | |
| 2657015 | 3/1978 | Fed. Rep. of Germany . | |
| 1151513 | 1/1958 | France | 188/72.6 |
| 2365726 | 4/1978 | France . | |
| 2367220 | 5/1978 | France | 188/72.6 |
| 2370898 | 6/1978 | France . | |
| 732272 | 6/1955 | United Kingdom . | |
| 989562 | 4/1965 | United Kingdom . | |
| 1017561 | 1/1966 | United Kingdom . | |
| 1494730 | 12/1977 | United Kingdom | 188/72.9 |
| 1561137 | 2/1980 | United Kingdom . | |

Primary Examiner—Douglas C. Butler
Assistant Examiner—R. R. Diefendorf
Attorney, Agent, or Firm—Wicks & Nemer

[57] ABSTRACT

A caliper brake including a base having a single pole extending therefrom with a pair of identically formed opposed arms pivotally mounted on the pole. On one end of each of the arms is pivotally mounted a brake shoe, and the other ends of the arms have an air bladder interposed therebetween for moving the brake shoes together. Each of the arms carries an adjustable pin engageable with a central stop pin mounted on the base and extending centrally between the arms for orienting the arms relative to a disc positioned between the shoes for braking of the disc. An air bladder is mounted between the other ends of the arms for pivoting the arms and moving the brake shoes together, the bladder having an intrinsic spring return properties which separate the brake shoes when the air bladder is deactivated.

2 Claims, 6 Drawing Figures

PIVOTED LEVER CALIPER BRAKE

CROSS REFERENCE

This is a continuation of application Ser. No. 06/053,413, filed June 29, 1979 now abandoned.

SUMMARY

The invention relates to an improvement in what is commonly known in the trade as a caliper brake. Known caliper brakes includes linkages of one sort or another which have disadvantages of construction effectiveness and maintenance.

It is an object of the invention to provide a caliper brake having a single pole on which a pair of brake arms are pivotally mounted. On one end of each arm is pivotally mounted a brake shoe in opposed relation and between the other ends of the arms is mounted an air bladder which when expanded moves the shoes together for braking a disc associated with a machine for braking, the disc interposed between the shoes. The air bladder being of resilient material has intrisic return properties which returns the brake shoes to a separated condition.

It is a further object of the invention to provide a caliper brake which has a minimum of parts and which has a deep throat construction that allows the brake shoes to be placed e.g. inwardly of a row of teeth of a circle saw or sprocket. The construction allows easy replacement and interchange of brake shoes.

It is a further object of the invention to provide a caliper brake in which the pivoted brake arms are identical which reduces the cost of manufacture and inventor classification. It is also an object of the invention to provide a caliper brake having a pin on each arm for simply and effectively orienting the brake shoes relative to the disc member to be braked.

It is a still further object of the invention to provide brake shoes each having arcuate inner and outer edges with the ends thereof on a radius which gives even pressure over the entire area of the shoe and allowing a greater area of brake surface for a caliper brake which gives lower shoe temperature and wear. The arc length of the shoe with each end formed on a radius provides additional shoe area radially outwardly which keeps up with the greater speed of travel at greater diameters of a disc to be braked.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
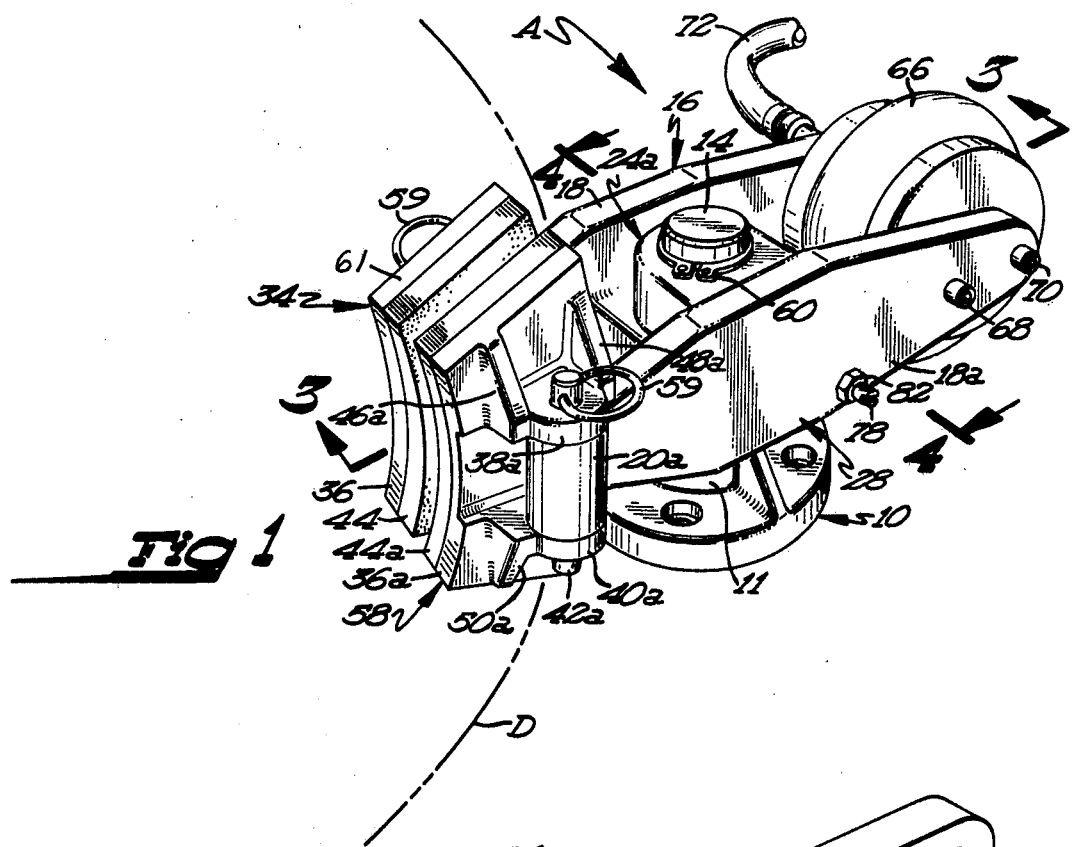
FIG. 1 is a perspective view of a caliper brake embodying the invention with a disc to be braked shown in phantom-outline.
Figure 2:
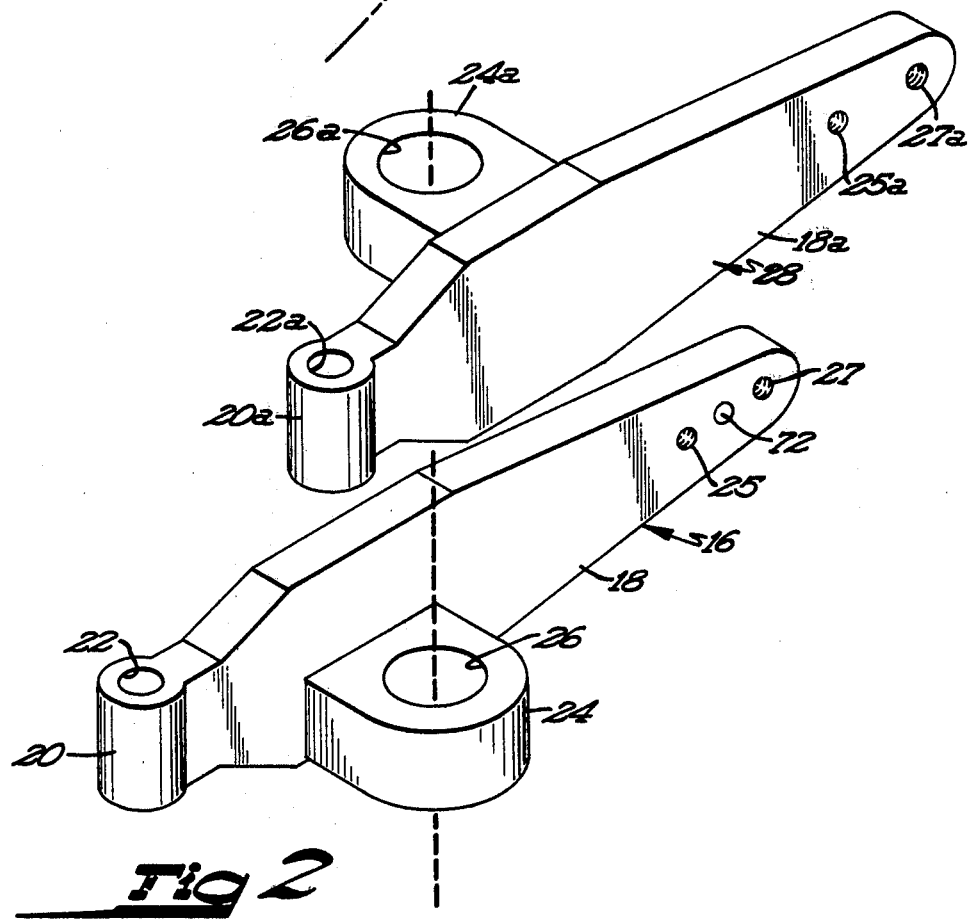
FIG. 2 is a perspective view of the arms of the brake shown as removed therefrom.
Figure 3:
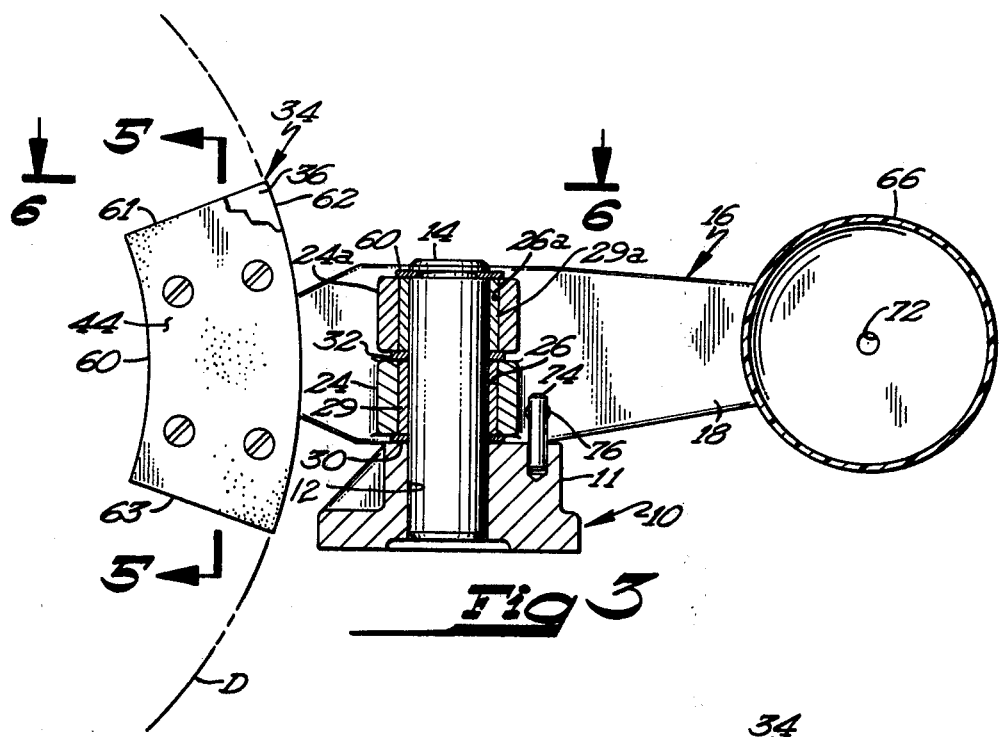
Figures 4, 5:
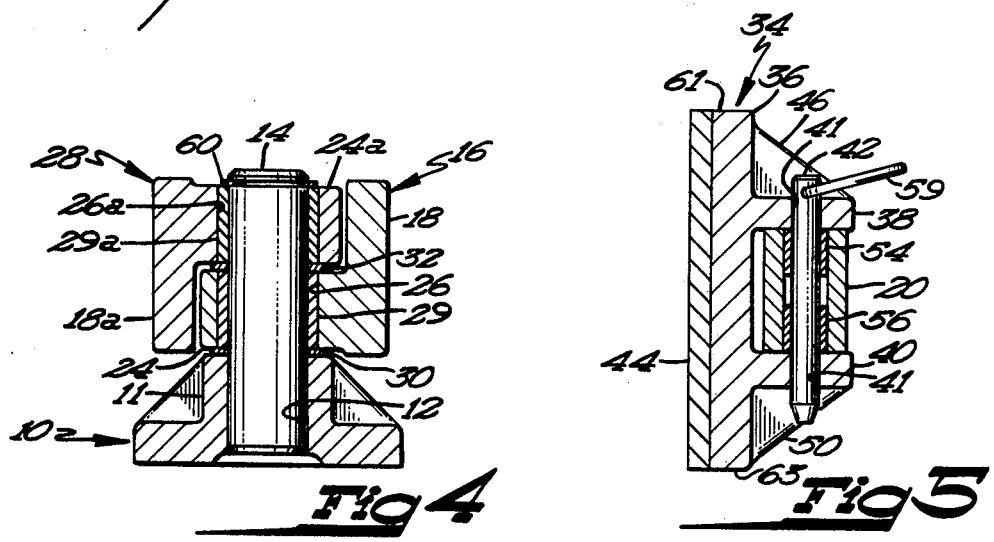
Figure 6:
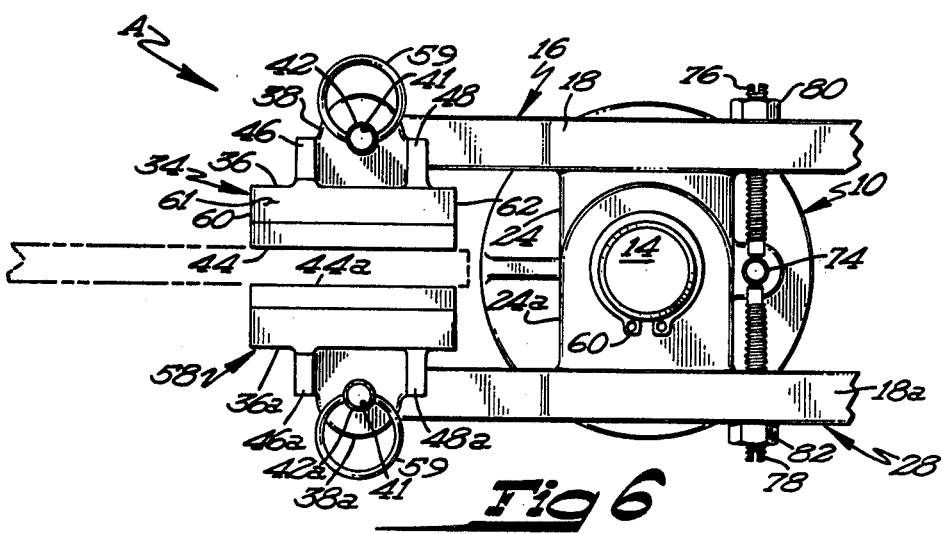

FIG. 3 is a sectional view on the line 3—3 of FIG. 1.
FIG. 4 is a sectional view on the line 4—4 of FIG. 1.
FIG. 5 is a sectional view on the line 5—5 of FIG. 3.
FIG. 6 is a view on the line 6—6 of FIG. 3.

Referring to the drawings in detail, the caliper brake A includes the base 10 having a boss 11 which has the hole 12 formed therein and in which the lower portion of the single pole 14 is press fit into the hole 12. Further provided is a first pivoting brake arm 16 which includes the flat portion 18 on the inner end of which is formed the end boss 20 having the hole 22 formed therethrough. The flat portion 18 has a side boss 24 formed thereon and through which is formed the hole 26 the axis of which is parallel to the axis of the hole 22. The outer end of the arm 18 is formed with the holes 25 and 27.

The numeral 28 designates a second pivoting brake arm that is identical to the first arm identical parts of which bear identical reference numerals accompanied by a lower-case letter a. The first arm 16 is pivotally mounted on the pole 14 with the pole extended through the friction bearing 29 mounted in the hole 26 and the arm bottoming out on the lower spacer-ring 30 positioned on top of the base boss 11. Mounted on the pole 14 on top of the boss 24 is the upper spacer ring 32, and mounted upon the pole 14 and upon the ring 32 is the boss 24a of the second pivoting arm 28. With the arms pivotally mounted in such a juxtaposed positions the same may be pivoted to and from the other as will be further described hereinafter.

The numeral 34 designates a first brake shoe including the plate portion 36 from which extends a pair of spaced flanges 38 and 40 each having a hole 41 formed therethrough which receive the pin 42. Secured to the plate portion 36 is the friction facing 44. The flange 38 is strengthened by the spaced webs 46 and 48 formed integral with the flange 38 and plate portion 36. The flange 40 is strengthened by a pair of spaced flanges 50. The shoe 34 is pivotally mounted on the boss 20 of the arm 16 by positioning the pin 42 through the holes 41 of flanges 38 and 40 and through the bearings 54 and 56 in the hole 22 of the boss 20.

Further provided is a second brake shoe 58 which is identical to shoe 34 but mounted as a left with respect to shoe 34 as a right, the identical portions bearing identical reference numerals but accompanied by a lower case letter a. Each of the pins 42 and 42a has a ring 59 connected to the top end thereof for easy insertion and removal of the pin for maintenance of the brake shoes. The arm 28 is pivotally secured upon the arm 16 by means of the lock ring 60.

Each of the shoe plate portions 36 and 36a, is arcuately formed to a radius on both inner and outer edges 62 and 64, respectively, with the ends 61 and 63 on a radius. It has been found that with the increase of arc length and area of a shoe travel there is an increase of wear due to the greater velocity at the outer extremity and that with the increase of arc in the friction linings, which coincide with the shoes, the wear throughout the lining faces is substantially even with the instant invention.

The numeral 66 designates a conventional air bladder mounted between the ends of the arms 16 and 28 on each side by means of a pair of bolts 68 and 70. The bladder is connected to an air supply line 72 which is used to expand the bladder which brings the shoes closer together while the intrinsic resilience of the bladder returns the arms together and the shoes apart.

Further provided is the central stop pin 74 anchored in and extending upwardly from the base 10 and centrally between the arms 16 and 28 and against which the guide pins 76 and 78 are adjustably positioned. The pin 76 is threadedly mounted in the arm 16 with the lock nut 80 whereby the pin 76 may be caused to extend more or less inwardly of the arm 16. The pin 78 is similarly and threadedly mounted in the arm 28 with the lock nut 82 whereby the pin 78 may be caused to extend more or less inwardly of the arm 28. With the pins 76 and 78 used in conjunction with the stop pin 74 the shoes may be oriented easily and precisely for equal braking with regard to a disc to be braked such as D.

Having thus described the invention, what is claimed as new and desired to be secured by Letters Patent is:

1. A caliper brake comprising:
   (a) a base,
   (b) a single pole mounted on said base and normal thereto,
   (c) first and second identical brake arms having first and second ends,
   (d) each of said arms having a pole boss extending therefrom intermediate the first and second ends and adjacent an edge of the arm and spaced from the opposite edge thereof and
   (e) a hole extending therethrough, said pole extended through the holes of said pole bosses with the pole boss of one arm positioned upon the pole boss of the other arm with the holes of said pole bosses in alignment thereby mounting said arms in pivotal juxtaposition,
   (f) first and second brake shoes each having a friction facing thereon,
   (g) each of said arms having a shoe boss on the first end thereof, and a hole extending therethrough parallelly disposed to the hole in the pole boss,
   (h) each of said brake shoes having a pair of spaced flanges and
   (i) each flange having a hole extending therethrough,
   (j) first and second pins extending through each of the holes of said flanges of said first and second brake shoes and extending through the shoe boss of the first ends of said first and second arms thereby pivotally mounting said brake shoes on said arms,
   (k) said base having a stop pin extending upwardly therefrom and parallelly disposed to said single pole,
   (l) first and second guide pins mounted on said first and second arms intermediate the pole boss and the second end of said arms and extending normal thereto and contactable with said stop pin,
   (m) means for adjustably positioning each of said guide pins relative to the brake arm for adjusting the pivotal position of said brake arms each to the other, and
   (n) means interposed between the second ends of said brake arms for pivoting said arms upon said pole and the friction facings thereof together to grip a disc positioned between said friction facings of said shoes and away from each other for release of the disc.

2. The device of claim 1 in which said means interposed between the second ends of said brake arms for pivoting said arms includes a single air operated bladder.

* * * * *